United States Patent
Benayoun et al.

(10) Patent No.: US 6,387,452 B1
(45) Date of Patent: May 14, 2002

(54) METHOD AND DEVICE FOR COATING SUBSTRATE TO PROVIDE IT WITH ANTIADHESIVE PROPERTIES, USING A CROSS-LINKABLE SILICON COMPOSITION

(75) Inventors: Jean-Paul Benayoun, Villeurbanne; Christophe Guyot, Lyons; André Lievre, Saint-Genis-Laval; Christian Mirou, Lyons, all of (FR)

(73) Assignee: Rhodia Chimie, Boulogne Billancourt Cedes (FR)

( * ) Notice: Subject to any disclaimer, the term of this patent is extended or adjusted under 35 U.S.C. 154(b) by 0 days.

(21) Appl. No.: 09/230,339

(22) Filed: Feb. 2, 1999

(30) Foreign Application Priority Data

Mar. 21, 1997 (FR) .............................. 97 03722

(51) Int. Cl.⁷ .............................. B05D 5/08; B05D 1/42
(52) U.S. Cl. ..................... 427/387; 427/391; 427/397.7; 427/426
(58) Field of Search .............................. 427/397.7, 387, 427/391, 428, 426; 118/694

(56) References Cited

U.S. PATENT DOCUMENTS 4,745,011 A * 5/1988 Fukuta et al. ................ 427/426
5,629,387 A * 5/1997 Frances et al. .............. 525/478
5,795,947 A * 8/1998 Frances et al. ................ 528/15

* cited by examiner

Primary Examiner—Shrive P. Beck
Assistant Examiner—Kirsten A. Crockford

(57) ABSTRACT

The present invention relates to an anti-adhesion treatment process by continuous coating of a strip of paper, this coating comprising a silicone composition based on polyorganosiloxanes (POSs) of FC/LTC type. According to this process, a POS A, a crosslinking agent B (hydrosilylation and/or dehydrogenopolycondensation), a catalyst C and, optionally, an inhibitor D, an adhesion modifier E and other compounds F are used. These constituents A to F are mixed continuously and in metered amounts, selecting mixing conditions such that the bath lifetime BLT is <10 h, such that the bath homogeneity is such that its DSC signature comprises a Gaussian peak (FIG. 2), and such that the flow rate of production of the homogeneous mixture A to F is such that the duration d separating the placing together of the components A, B and C and the time of application of the composition to the traveling support strip is less than or equal to the BLT. This process also includes Steps (2) for conveying the composition to the coating site, Step (3) for coating the strip of paper with the composition and Step (4) of thermal crosslinking.

14 Claims, 2 Drawing Sheets

DIAGRAM FOR THE ABSTRACT

METHOD AND DEVICE FOR COATING SUBSTRATE TO PROVIDE IT WITH ANTIADHESIVE PROPERTIES, USING A CROSS-LINKABLE SILICON COMPOSITION

This application is an application under 35 U.S.C. Section 371 of International Application Number PCT/FR98/00565, filed on Mar. 20, 1998.

The field of the present invention is that of silicone compositions which are crosslinkable by activation, which can be used in particular to form an anti-adhesive coating or film for a fibrous or non-fibrous support, for example a support made of paper or the like, or alternatively made of natural or synthetic polymer.

More specifically, the invention relates to a process for the continuous coating of a travelling support strip (e.g. paper, fabric, polymer), in order to give it anti-adhesion properties, the said coating being carried out using a silicone composition based on polyorganosiloxane (POS).

The anti-adhesive POSs which are of interest in the context of the invention are of the type which are crosslinkable, by hydrosilylation or by dehydrogenopolycondensation, thermally or by a combination of heat and radiation (UV radiation or an electron beam).

Even more specifically the POSs considered are, for example, "fast-cure" and "low-temperature-cure" FC/LTC POSs.

The present also relates to the device and to the silicone composition involved in the continuous coating process, which constitutes its main subject.

Conventionally, anti-adhesive silicone compositions comprise at least one POS A, a crosslinking agent B which is a POS and a catalyst. These ternary compositions can only exist transiently in non-crosslinked form. The reason for this is that, irrespective of the crosslinking mechanism concerned: hydrosilylation or dehydrogenopolycondensation, POSs of SiH type placed in the presence, in the first case, of POSs of SiVi type and of platinum hydrosilylation catalyst, or placed in the presence, in the second case, of POSs of SiOH or SiOR type and of platinum or tin condensation catalyst crosslink relatively quickly. The speed of crosslinking depends in particular on the reaction temperature.

Moreover, it should be recalled that the POSs which make up these anti-adhesive compositions can be in non-crosslinked form, in pure form or in the form of crosslinkable liquid solutions or emulsions.

It follows therefrom that for the anti-adhesion treatments of supports (paper, fabric or polymer film), which consist in coating the surface of these supports with the abovementioned silicone compositions, it is imperative to apply and spread the said compositions when they are in non-crosslinked liquid form and thus entirely suited for use in the said operations.

Once the supports are coated with silicone composition, they are subjected to heating so as to accelerate their crosslinking.

In the light of the above, two difficulties can thus readily be foreseen, among others, which will arise when anti-adhesion treatments by silicone coating, e.g. of paper or of thermoplastic films, at the industrial speed and on the industrial scale are envisaged.

The first difficulty is associated with the fact that the heat-crosslinking silicone systems (using pure POSs, POSs in emulsion or in a solvent phase, etc.) which are usually used require crosslinking temperatures of between 100 and 200° C. It is clear that at these temperatures, it is difficult, if not impossible, to envisage coating certain supports such as thermoplastic films, for instance polyethylene, polypropylene, PVC and, to a lesser extent, polyethylene glycol terephthalate. These silicone systems are also characterized by bath lifetimes BLTs of greater than or equal to 10 hours, and in practice between 12 and 24 hours.

The term BLT denotes the time required to double the dynamic viscosity measured at 30° C. The dynamic viscosity can be measured using a Brookfield viscometer according to the indications of AFNOR standard NFT76102 of May 1982.

BLTs≧10 hours give manufacturers a sufficient time margin to carry out the silicone coating at an industrial speed and on an industrial scale, while at the same time placing the constraints at a tolerable level. Unfortunately, the limitation imposed by the high crosslinking temperatures, as regards the variety of supports which can be treated by anti-adhesive silicone coating, constitutes a major handicap.

In addition, these high temperatures are detrimental to the product efficiency and financial viability of the coating treatments, on account of the high energy cost and long time required.

In an attempt to overcome these difficulties, solvent-free anti-adhesive silicone systems which can be thermally crosslinked and which claim an application performance known as LTC (low temperature crosslinking) have been proposed.

These thermal silicone systems crosslink at temperatures of between 60 and 110° C. Unfortunately however, the corollary of this advantageous decrease in crosslinking temperature is a significant drop in the BLT which can fall quite considerably below 10 hours.

Such BLTs are incompatible with the current constraints of industrial use, which are intrinsic to the silicone anti-adhesion treatment by coating. The reason for this is that the preparation of the mixture forming the silicone composition is generally carried out in a batchwise manner. However, in these techniques, the supply of the coating head from the tank(s) in which the mixture is prepared necessarily involves periods of stagnation of the liquid silicone composition, before it is applied onto the support. It can thus readily be appreciated that with short BLTs, problems of gelation and of setting to a solid are liable to occur and to appreciably damage the quality of the coating.

Furthermore, the fact that one is constrained to prepare relatively large batches can entail considerable economic handicaps as soon as any incident liable to interrupt the process occurs on the coating line.

In summary, the industrial procedures for coating silicones are not entirely suited to LTC anti-adhesive silicone compositions, which correspond to the current best efforts as regards crosslinkable silicone systems for anti-adhesion. Their unsuitability is reflected in terms of cumbersome methodology, low production efficiency and financial viability, high cost and poor quality of the anti-adhesive coatings obtained.

Figure 1:
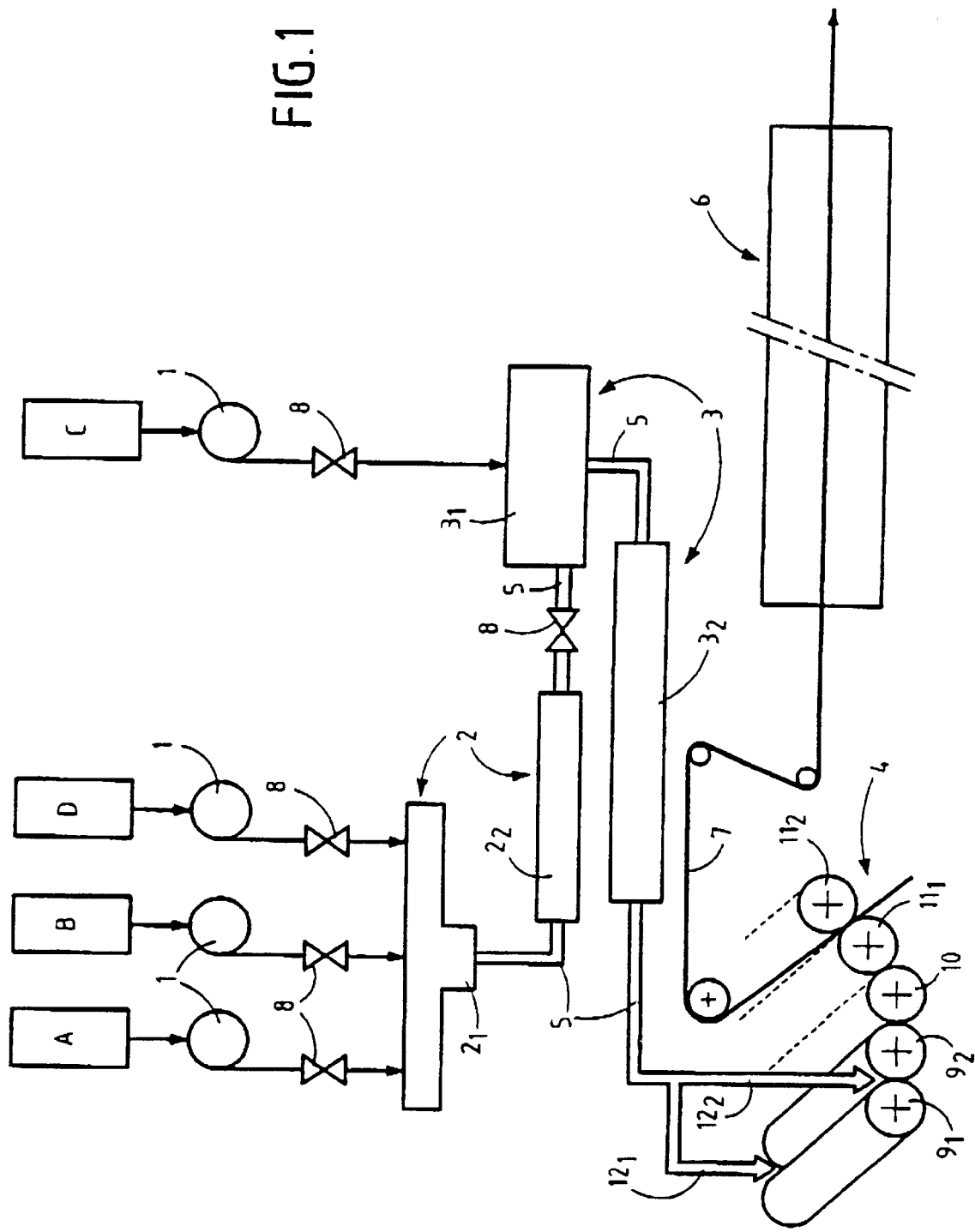
FIG. 1 is a drawing of the preferred embodiment of the process apparatus of the present invention.

More generally, the industrialists who apply anti-adhesive silicone systems are looking forward to the arrival of a coating process which is more universal as regards the range of supports which can be coated with a coating obtained by thermal crosslinking or under the combined effect of heat and radiation, i.e. a process which allows lower crosslinking temperatures while at the same time retaining bath lifetimes for the non-crosslinked liquid silicone composition, which are of an acceptable level and are compatible with the industrial requirements for large-scale and high-speed production.

It is also desirable to have available crosslinkable silicone compositions which have high crosslinking kinetics, so as to achieve gains in production efficiency and financial viability here also.

The problematics underlying the invention can thus come down to the establishment of a compromise between the crosslinking temperature/crosslinking kinetics/bath lifetime parameters.

In more pragmatic terms, the object to be achieved would also be to develop an astute, optimal mixing technique, with regard to the industrial expectations in terms of anti-adhesive silicone coating at industrial speed and on industrial scale.

There is another impediment to the optimization of the industrial processes for anti-adhesive silicone coating, which is associated with the fact that these compositions require very specific and reliable doses of the various ingredients. This is all the more complicated since the ratios between these ingredients are very important: base POS relative to the crosslinking agent and relative to the catalyst.

Faced with these problematics, the inventors have, to their credit:
- on the one hand, demonstrated that the management of the crosslinking temperature/crosslinking kinetics/BLT parameters should be simplified by dispensing with one of these parameters, namely the BLT, and
- on the other hand, developed a continuous coating process which involves steps of metering, homogeneous mixing and supplying of the coating head on a machine, this process making it specifically possible, surprisingly and unexpectedly, to dispense with the BLT parameter.

Thus, the present invention relates to a process for the continuous coating of a travelling support strip in order to give it anti-adhesion properties, the said coating being carried out using a silicone composition comprising: at least one polyorganosiloxane A, at least one crosslinking agent B which can be crosslinked by hydrosilylation and/or by dehydrogenopolycondensation, and an effective amount of catalyst C, characterized in that it consists, essentially:
1. in continuously mixing in measured amounts, in particular, the POS(s) A bearing reactive groups RGa, the crosslinking agent(s) B bearing reactive groups RGb, and the catalyst C; by:
   optionally preparing at least one premix AB and/or AC and/or BC when this premix can be prepared,
   selecting mixing conditions such that:
      the bath lifetime (BLT) is less than 10 h, preferably less than 4 h and even more preferably less than 2 h,
      the bath homogeneity is such that its differential scanning calorimetry DSC signature comprises at least one essentially Gaussian peak showing,
         a peak start temperature T1,
         a peak summit temperature T2,
         a peak end temperature T3,
      this peak being characterized by:
         i-$T3 \leq 110°$ C., preferably $\leq 90°$ C. and even more preferably $\leq 80°$ C.,
         -ii-$\Delta T = T3 - T1 \leq 30°$ C., preferably $\leq 20°$ C. and even more preferably $\leq 15°$ C., T3 possibly not satisfying the parameter -i- above, and
         -iii-$\Delta T = \Delta T \text{ref} \pm 10°$ C., preferably $= \Delta T \text{ref} \pm 8°$ C., and more preferably $= \Delta T \text{ref} \pm 4°$ C., $\Delta T$ ref corresponding to T3ref−T1ref,
      obtained from the DSC signature peak of a reference ABC mixture prepared according to the procedure Pr defined below in the present specification,
      the flow rate of production of the homogeneous mixture is between a value corresponding to the rate of consumption of the mixture on the coating site(s) and a value which determines the constitution of a buffer reserve,
      this flow rate value being such that the duration d separating the time at which the components A, B and C are placed together and the time of application of the composition ABC to the travelling support strip is less than or equal to the BLT,
2. in conveying, simultaneously or otherwise, the composition directly from the mixer to the coating site(s),
3. in coating the travelling support strip with the composition,
4. in allowing the thermal crosslinking to take place.

The DSC (Differential Scanning Calorimetry) analysis is carried out, in a manner which is known per se, using a Metler TA 4000 type machine with the following operating parameters: rate of temperature increase: 10.0° C./min; mass of the test sample: 15 mg; working in an open aluminium crucible.

One of the essential principles governing the present invention relates to the combination of a procedure for the precise metering and homogeneous mixing of the compounds according to the anti-adhesive coating silicone composition, using appropriate means and opting to vary carefully selected parameters.

These parameters are:
   the bath lifetime, which is lowered to less than 10 hours by varying the nature and/or the proportions of the components A, B and C and/or of their possible premixes,
   the homogeneity of the mixture, which is controlled via the DSC signature, allowing a calibration relative to a reference mixture, and
   the flow rate of production of homogeneous mixture, which is adjusted to the rate of consumption with or without formation of a coating buffer reserve.

The mixture thus metered and homogenized is conveyed directly to the coating head of the machine, such that only the amount of mixture required to feed the coating head (for example with a buffer reserve of from 10 to 30 min of consumption) is prepared.

The advantages of the process according to the invention are numerous. Mention may be made in particular of:
   decreasing the crosslinking temperature of the mixtures used, which results in the possibility of coating and thermally crosslinking heat-sensitive supports such as, for example, PE, PP, PVC and PET films,
   possibility of working with silicone systems whose BLT is less than 10 h and in order go down to values as low as those below 2 h,
   continuous preparation of the minimum amount of mixture required to feed the coating head, resulting in reduced losses in the event of an incident which interrupts the coating treatment,
   reliability and precision of metering of the components in ratios which can go down to 1:100 or less than 1:100, even when working with low flow rates; the precision can be about 2%, resulting in increased uniformity of the quality of the finished products, elimination of the risks of metering error arising from methods for preparing a batch mixture by manual weighing, elimination of the risks of contamination with gels arising from the automatic systems for preparing the batch mixtures, improvement in production efficiency: reduction in labour time and in losses of material, simplification of the flow of silicone starting materials, ease of preparation of the mixture: less handling and fewer tiresome operations, and thus reduced risk of incidents, flexibility of use in changing the metering ratio and speed of use on machine: less loss of material, speed in manufacturing changes, saving in operating time on machine for non-productive tasks.

The inventors have, to their credit, developed a continuous coating method which makes it possible industrially to use thermal silicone systems which crosslink (polyaddition or dehydrogenopolycondensation) at such low temperatures and with BLTs as short as values of less than 10 hours.

This innovation requires both expertise in silicone chemistry and mastery of techniques for precise metering in ratios e.g. of about 1:100 and for continuous intimate mixing of more or less viscous products which can be used at low flow rate.

Moreover, this process is advantageous for the use of any silicone system without solvent, with solvent, or of the emulsion type, which can be crosslinked thermally (polyaddition or dehydrogenopolycondensation) optionally combined with a radiation, intended for coating as a thin layer of anti-adhesive coating on any support, paper, polymer or textile.

Advantageously, the procedure Pr for establishing the reference mixture ABC in order to arrive at the comparative parameter ΔTref for the BLT peaks of the mixture consists in mixing the same constituents A, B and C in the same proportions in order to prepare, in a container, a mixture of 250 cm$^3$, with moderate stirring using an impeller rotating at 1000 rpm for at least 15 min, at room temperature (25° C).

In practice, the buffer reserve can be determined by the two attached cylinders, which can be driven in rotation in opposite directions and which constitute the coating head. This reserve is, for example, between 10 and 30 min of consumption of the composition used to carry out the coating.

The rate of coating consumption depends on the travelling speed of the support strip, the width and nature of this strip (absorbing power) and on the viscosity of the crosslinkable silicone composition and the size of the desired deposit (g/m$^2$).

In accordance with Step 2 of the process, the at least partially mixed composition is conveyed to the coating head simultaneously or otherwise, since it is possible to envisage using static or dynamic mixing means, through which a flow of material travels, the said flow being produced by supplying or conveying means such as, for example, pumps, and in particular volumetric pumps, or pressurized storage containers.

According to a preferred embodiment of the invention relating to Step 1, conditions for mixing A, B and C are used such that the homogeneity obtained is reflected by a DSC peak in which the parameters (i), (ii) and (iii) are cumulatively satisfied.

This corresponds to an LTC/FC silicone system, given that although such systems are preferred in accordance with the invention, other silicone systems which crosslink at a higher temperature and/or slightly more slowly are not, however, excluded.

In order to improve the coating conditions, provision is made such that the dynamic viscosity at 25° C. of the homogeneous mixture is less than or equal to 10,000 mPa.s, preferably less than or equal to 1000 mPa.s.

In accordance with a preferred embodiment of the invention, the continuous coating process comprises a preliminary Step 0 consisting:

in premixing A and B and/or A and C and/or B and C when this is possible, and/or in using a premix AB.

A, B and C are the base compounds of the composition intrinsic to the process according to the invention. However, in reality, it is preferable to add other ingredients to them, possibly by adopting methodology variants consisting in preparing premixes of these additional ingredients with compounds A, B and C. Thus, it is advantageously possible to incorporate:

into at least one of the starting compounds A, B and C and/or into the premix AB and/or AC and/or BC when this premix can be prepared, or into the bath containing the compounds A, B and C, at least one crosslinking inhibitor D (this is particularly the case when silicone systems which crosslink by hydrosilylation are used), and/or at least one adhesion modifier E, and/or at least one other component F.

It should be understood that:

when the composition according to the process of the invention contains, along with the compounds A, B and C, the optional ingredients D and/or E and/or F, the DSC analysis and the procedure Pr mentioned above will then relate to the mixture consisting of A, B, C and of D and/or E and/or F.

According to an even more preferred embodiment of the invention, arrangement is made such that Step 1 is broken down as follows:

1'—premixing (Step 0) of the compounds A, B+optionally D and/or E and/or F;

1"—followed by homogeneous mixing of the premix (e.g. AB, ABD, ABDE, ABDEF, ABE, ABF, ABDF, ABEF) with compound C.

Without this being limiting, the POS A is preferably selected from:

the group comprising:

POSs which contain, per molecule, at least two groups RGa, located in the chain and/or at the chain end(s), each consisting of a $C_2$–$C_{10}$ alkenyl group linked to the silicon, preferably a vinyl group, and mixtures thereof, while the crosslinking agent B consists of at least one POS containing, per molecule, at least two and preferably at least three groups RGb, each consisting of a hydrogen atom linked to the silicon, located in the chain and/or at the chain end(s);

A reacting with B by hydrosilylation.

For such compounds A and B, it has been possible to demonstrate that the molar ratio RGb:RGa advantageously needs to be within the range from 1 to 5, preferably 1.1 to 3 and even more preferably 1.5 to 2.5.

This relates to the context in which a person skilled in the art is capable of finding molar ratios which are suitable for satisfying the operating parameters of the invention, as defined above, and of applying them to the case of compounds A and B which can be crosslinked by hydrosilylation.

Examples of POSs A are
(dimethyl)polysiloxanes containing dimethylvinylsilyl ends, (methylvinyl)(dimethyl)polysiloxane copolymers containing trimethylsilyl ends, (methylvinyl)(dimethyl) polysiloxane copolymers containing dimethylvinylsilyl ends and cyclic (methylvinyl)polysiloxanes.

Examples of crosslinking agents B are
(dimethyl)polysiloxanes containing dimethylhydrogenosilyl ends, (methylhydrogeno)polysiloxanes containing trimethylsilyl ends, (dimethyl)(methylhydrogeno) polysiloxane copolymers containing trimethylsilyl ends, cyclic (methylhydrogeno)polysiloxanes and resins M'Q consisting of $(CH_3)_2HSiO_{1/2}$ and $SiO_2$ units.

The bases of polyaddition silicone composition can include exclusively linear POSs such as, for example, the one described in U.S. Pat. Nos. 3,229,172, 3,697,473 and 4,340,709 or else they may include branched POS or POS in a lattice such as, for example, the one described in U.S. Pat. Nos. 3,284,406 and 3,434,366.

According to one variant, the POS A is selected from:
polydiorganosiloxanes bearing at least two condensable or hydrolysable groups RGa, located in the chain and/or at the chain ends, each consisting of a group OR linked to the silicon, in which R is a hydrogen atom or a $C_1$–$C_6$ alkyl radical,
and mixtures thereof;
whereas the crosslinking agent B is of the type POS B bearing RGb=H;
A reacting with B by dehydrogenopolycondensation;
and in that the molar ratio RGb:RGa is within the range from 1 to 5, preferably 1 to 3.

Examples of POSs A which can be crosslinked by dehydrogenopolycondensation are
(dimethyl)polysiloxanes containing hydroxydimethylsilyl ends or containing alkoxydimethylsilyl or dialkoxymethylsilyl ends with alkoxy being methoxy, ethoxy or propoxy.

The POSs which can constitute the compounds A and B of the systems for crosslinking by dehydrogenopolycondensation can have, here also, a structure which is linear, which may be branched, cyclic or in a lattice.

As regards the effective amount of catalyst C relative to the other components A and B, this means a concentration of C which is necessary and sufficient to allow the crosslinking according to the kinetics required by the methodology according to the invention and in order to achieve the usual characteristics, expected in the anti-adhesive coating application.

In the case of a silicone system which crosslinks by hydrosilylation, any standard hydrosilylation catalyst can be used in the process according to the invention. Preference is given in particular to platinum-based catalysts, especially Karstedt-type catalysts. Thus, the polyaddition catalyst C is preferably chosen from platinum and rhodium compounds. Complexes (Karstedt) of platinum and of an organic product described in U.S. Pat. Nos. 3,159,601, 3,159,602 and 3,220, 972 and European patents Nos. EP 0,057,459, EP 0,188,978 and EP 0,190,530 can be used in particular, or alternatively complexes (Karstedt) of platinum and of vinyl organosiloxanes described in U.S. Pat. Nos. 3,419,593, 3,715,334, 3,377,432 and 3,814,730.

In order to establish the ideas, it can be pointed out that it is preferable for the amount or the concentration of C to be between 10 and 250 ppm of catalyst taken in the metallic state, preferably from 30 to 200 ppm and even more preferably from 50 to 150 ppm, relative to the amounts of compounds A and optionally D and/or E used.

The catalysts C used in the type of crosslinking by dehydrogenopolycondensation are either platinum-based catalysts such as those mentioned above, or standard condensation catalysts composed of at least one metal belonging to the tin group, the latter metal being particularly preferred. It can be, for example, dibutyltin dilaurate.

When the catalyst C is platinum-based, it is used in the proportions indicated above, and when it is tin-based, its amount, expressed as ppm of tin metal relative to the amounts of compounds A and optionally D and/or E, is between 1000 and 5000 and preferably between 2000 and 4000.

In the preferred variant of the invention, in which an inhibitor D is incorporated into a system in which the crosslinking between A and B-takes place at least partly according to a hydrosilylation mechanism, the preferred inhibitors D are chosen from the group comprising: α-acetylenic alcohols, azodicarboxylates, maleic esters and mixtures thereof, 3,7,11-trimethyldodec-1-yn-3-ol (TMDDO) and ethynylcyclohexanol (ECH) being preferred.

As an example of a hydrosilylation reaction inhibitor D which can be used, mention may be made of those described in French patent application No. 2,704,553 relating to long-chain α-acetylenic alcohols. The content of that patent application is moreover incorporated in its entirety into the present specification by reference.

As regards the azodicarboxylate-type inhibitors D, reference will be made to European patent application No. 0,184,965 which describes in detail such polyaddition crosslinking reaction inhibitors. The content of that patent application is, itself also, included in its entirety in the present application by reference. As examples of azodicarboxylate-type inhibitor compounds, mention may be made of ethyl azodicarboxylate.

As regards maleic ester type inhibitors D, reference will be made to French patent application No. 2,456,767 which describes such inhibitors in detail. The content of that patent application is, itself also, included in its entirety in the present application by reference. As examples of inhibitor compounds of this type, mention may be made of di-n-butyl maleate and diallyl maleate.

As regards another optional compound of the silicone composition which is intrinsic to the process of the invention, i.e. the adhesion modifier E, this is preferably selected from the group of compounds formed by:
POS modifying resins containing an Si alkenyl function, which are described in French patent application No. 2,704,553 (resins referred to in this document as "Si alkenyl") MRs);
POS modifying resins containing an SiH function, which are described in French patent application No. 2,704, 553 (resins referred to in this document as "SiH" MRs);
POS modifying resins containing an Si—OH function, consisting of at least two different types of siloxy units "M" ($R_3SiO_{1/2}$), "Q" ($SiO_2$) and/or "T" ($RSiO_{3/2}$) and optionally "D" ($R_2SiO_{2/2}$), the organic radicals being identical or different and representing $C_1$–$C_{18}$ alkyl or cycloalkyl groups or phenyl groups, at least 80 mol % of the organic radicals representing a methyl group, the said resin containing at least 0.1 mol %, preferably from 0.5 to 5 mol %, of hydroxyl groups attached to the silicon with a ratio: number of units "M"/number of units "Q" and/or "T" of 0.6–1, the number of optional units "D" being 0.5–10 per 100 mol of resin;

mixtures of two or more than two of the abovementioned resins with each other;

mixtures of at least one of the abovementioned resins with the so-called "reactive" solvents which are described in French patent application No. 2,704,553 (it being recalled that the content of that patent application No. 2,704,553 is included in its entirety in the present application by reference).

As examples of resins forming part of the constitution of the adhesion modifier E according to the present invention, mention will be made of the resins:

$MD^{Vi}Q$ in which the vinyl groups are included in the units D, $MM^{Vi}Q$ in which the vinyl groups are included in some of the units M, MD'Q in which the hydrogen atoms linked to the silicon are included in the units D, MM'Q in which the hydrogen atoms linked to the silicon are included in some of the units M, MQ(OH) in which the hydroxyl groups linked to the silicon are included in the units M.

As already mentioned above, the mixture prepared in accordance with the process of the invention can advantageously comprise at least one other component F consisting:

(i) of an aliphatic and/or aromatic organic solvent which does not take part in the reaction, this solvent preferably being the one in which A and/or B are dissolved to make a solution which represents the form in which A and/or B are used in the process;

(ii) and/or of water in the case of using an emulsion system.

According to a preferred characteristic of the invention, the concentration of inhibitor D is less than or equal to 0.5% by weight, preferably less than or equal to 0.2% by weight and even more preferably less than or equal to 0.15% by weight, relative to the amount of compounds A and optionally E.

The possibility of using such low concentrations of inhibitor D is a great advantage, in particular in terms of cost-effectiveness. This advantage is obviously inherent in the continuous process according to the invention.

The presence of an additional additive of the organic solvent type, which does not participate in the reaction, preferably an aliphatic or aromatic solvent, should be placed in relationship with the possibility which the invention offers of using starting compounds in solution form. The reason for this is that the POS resins A or B, or even the compounds C, D and E, can be supplied, metered, mixed and conveyed to the coating head in solution form.

According to an alternative, the compounds A, B, C, D and E can be used in emulsion form.

In accordance with an advantageous arrangement of the invention, provision is made such that the admission of metered amounts of the constituents A, B, C optionally D and/or E and/or F into the optional site(s) for premixing and/or into the site(s) for mixing C with the other components is carried out in a sequenced and repetitive manner.

Thus, when it relates, for example, in accordance with a preliminary step 1', to a premix of the compounds A, B and D, provision is made for the supply of the circuits with these 3 compounds to be carried out successively according to, for example, A/B/D or AD/B/A, repeated throughout the continuous functioning of the process.

According to another characteristic of the invention, the mixing and optionally premixing operations are subdivided into an upstream mixing step and a downstream mixing step.

The upstream mixing step corresponds to a placing in contact of all or some of the compounds while the downstream mixing step consists, in fact, of an intimate and homogeneous mixing operation of the abovementioned compounds with optional addition of the missing compound (s).

In practice, the organization of the flow of material in repeated sequences of several measures of each compound, for example A, B, D or A, B, D, C advantageously takes place upstream of the premixing site(s) or of the downstream mixing.

As has already been pointed out above, one of the key elements of the process of the invention relates to the continuous metering of the compounds of the composition. In order to carry out this operation correctly, use is preferably made, for each constituent A, B, C, optionally D and/or E and/or F of the composition, of metering means, in particular volumetric metering means, which are capable of ensuring the supply of a metered amount of each of these constituents as well as, at least partially, their circulation in a continuous flow, along the entire operating line.

As regards the mixing operations, or even the optional premixing operations, static or dynamic mixing means are advantageously used.

Besides the main parameters of this process mentioned above, the inventors have selected other parameters which it would be prudent to take into account in order to ensure correct functioning of the process. Thus, advantageously, the parameters also to be considered for the premixing and/or mixing are:

the travelling speed of the support strip, the rate of consumption of the coating composition, the bath lifetime BLT, the flow rates for supply of the constituents A to F to the mixing or premixing sites, the flow rates at the mixer or premixer outlet, the speed of the flow of mixture or even of the flow of the premix, the duration separating the placing of C together with the constituents required for the reaction and the deposition of the mixture on the support strip.

According to another of these aspects, the present invention relates to a device in particular for carrying out the process as defined above. This device is characterized in that it comprises:

means, in particular volumetric means, for metering the components A, B, C, optionally D and/or E and/or F, optional means for premixing the components other than C, means for homogeneously mixing the components A, B, C, optionally D and/or E and/or F, at least one member for coating the travelling support strip, means for conveying the homogeneous mixture from the mixing site(s) (means) to the coating member, and optionally from the premixing site(s) (means) to the mixing means, and means for heating the coated support strip, these means preferably consisting of at least one tunnel oven.

Advantageously, the optional premixing means comprise at least one upstream premixing chamber and downstream static premixing means, and the homogeneous mixing means comprise at least one upstream mixing chamber and downstream static mixing means.

Any system capable of coating in a thin layer can be used as coating member; mention will be made, for example, of the systems: "size press", air knife, Meyer bar, "direct etch" head, "multicylinder" head. Advantageously, the coating member consists of a "direct etch" head (or etched cylinder head) or of a "multicylinder" head, these members being widely used in the paper industry.

The structure and functioning of this device will be understood more clearly in the light of the description which follows, by way of non-limiting example, of a preferred embodiment of the said device, as well as examples for carrying out the continuous coating process according to the invention using the said device.

The device is described with reference to the attached FIG. 1 which represents a synoptic scheme of the preferred embodiment of the device according to the invention.

This device comprises means 1 for volumetric metering of the compounds A, B, D and C which are, respectively, a POS, a crosslinking agent, an inhibitor and an catalyst, for example a platinum or tin catalyst depending on whether the systems are of the polyaddition or dehydrogenopolycondensation type.

The device also includes means 2 for premixing the components other than C means 3 for homogeneously mixing the constituents A, B, D and C, a coating member 4, means 5 for conveying the premix and the homogeneous mixture from the premixing and mixing sites, respectively, to the coating member 4, and means 6 for heating the travelling support strip 7.

Metering means 1 are, for example, volumeters, i.e. geared mechanical components which allow precise measurement of a volume of product. Each volumic counter 1 is placed between a supply source of compounds A, B, D or C and the premixing means 2, as regards the constituents A, B and D and the homogeneous mixing means 3, as regards the catalyst C.

Each volumeter 1 behaves like a metering pump which takes the appropriate amount of compounds and injects it into the mixing circuit. An electrovalve 8 is fitted on the joint connecting each volumeter 1 to the premixing and mixing means 2 and 3, respectively.

The latter means comprise, respectively, an upstream premixing chamber 2.1 and a downstream mixing chamber 3.1, each connected, via a pipe 5 which forms the conveying means, to a downstream static premixing chamber 2.2 and to a downstream static mixing chamber 3.2, respectively.

The upstream chamber 2.1 and downstream chamber 2.2 allow premixing of the compounds A, B and D, while the upstream chamber 3.1 and downstream chamber 3.2 allow homogeneous and intimate mixing of the premix A, B, D with the catalyst C.

Each upstream chamber 2.1 and 3.1 is a member: (i) for static mixing which is known per se, consisting, for example, of a cylinder comprising coaxial toric channels, and (ii) for transit of the materials introduced. Each channel can be equipped with static mixing blades. Such a member makes it possible to ensure the first placing in contact of the products.

The downstream chambers 2.2 and 3.2 are, for example, static mixers of a type which is known per se, consisting of a hollow cylinder fitted on the inside with mixing stators (blades) and through which the silicone composition A, B, D or A, B, D, C can pass while being homogeneously and intimately blended and mixed.

An electrovalve 8 is fitted on the pipe 5 between the downstream chamber 2.2 and the upstream chamber 3.1.

The static mixers used in this device are mounted in-line in conveying means 5 (pipe) consisting, for example, of a flexible tube.

Advantageously, the coating member 4 is a "multicylinder" head consisting of two smooth cylinders 9.1 and 9.2 which define the coating head opposite which the end of the conveying means 5 emerges. The cylinders 9.1 and 9.2 are attached together and can be driven in rotation in opposite directions. The member 4 also comprises a relay cylinder 10 attached to the pair of cylinders 9.1 and 9.2 and provides the connection of this pair to a pair of cylinders 11.1 and 11.2, in the gap of which the support strip 7 travels in order possibly to be coated therein with crosslinking silicone composition A, B, D, C. This coating member 4 is known per se.

According to a preferred characteristic of the invention, the end of the means 5 for conveying the intimate mixture are subdivided into two branches 12.1 and 12.2 which ensure a supply at two points of the metering cylinders 9.1 and 9.2, with the crosslinking intimate homogeneous mixture A, B, D, C. Preferably, each of these two supply points is located close to one end of the injection head 9.1/9.2. According to variants, several injection points located along the entire length of the gap in the metering cylinders 9.1 and 9.2 may be envisaged.

The latter metering cylinders define a buffer reserve of intimately and homogeneously mixed composition A, B, D, C. By means of the cylinder 10 and the press 11.1/11.2, this composition is transferred and applied onto the support strip 7, which travels at a given speed in the direction indicated by the arrows on the drawing. This strip coated on one face then passes through the heating means 6 which are advantageously a tunnel oven, of the type known in the technical field considered.

The volumeters 1, the electrovalves 8, the coating member 4, the travelling strip 7 and the tunnel oven 6 can be controlled by a central control and computing unit which allows programming of the operating parameters of metering, of flow rate, of rate of consumption as reactive bath and of crosslinking temperature, inter alia.

According to variants of the invention, other means for activating the crosslinking may be envisaged in addition to the thermal crosslinking means, for example actinic radiation or an electron beam.

As a non-limiting example of continuous mixing and metering means which can be used in the device according to the invention, mention may be made of those described in French patent application No. 2,508,635 and in German Utility Model No. 296 06 710 (DOPAG).

EXAMPLES

Example 1

Tests of Continuous Coating of an Anti-Adhesive Silicone Composition, which is Thermally Crosslinkable by Hydrosilylation, of A POS Containing a Reactive Group RGa=Si—Vi, Using a POS Containing a Reactive Group RGb=Si—H 1.1. Equipment and Starting Materials The device used is the one represented in FIG. 1 and described above. More specifically, use is made in this example of a continuous mixing and metering machine such as Volumix® sold by the company DOPAG.

The coating member consists of a five-cylinder coating head.

The tunnel oven has the following characteristics: blowing of hot air via a nozzle onto the coated face in 3 zones each 2 meters in length, with a flow rate of air of 1800 m³ per hour and per zone.

The compounds A, B, D and C used are as follows:

premix of compounds A and D: POS A formed of an oil consisting of a (methylvinyl)(dimethyl)polysiloxane copolymer containing dimethylvinylsilyl ends containing 0.031 mol of vinyl/ 100 g, this oil being charged to a level of 0.15% by weight with inhibitor D consisting of an α-acetylenic alcohol: 3,7,11-trimethyldodec-1-yn-3-ol (TMDDO);

compound A: this is the vinyl POS oil used to prepare the premix AD;

crosslinking agent B: mixture comprising 70% by weight of POS of the (methylhydrogeno)polysiloxane type containing trimethylsilyl ends and 30% by weight of resin M'Q consisting of units $(CH_3)_2HSiO_{1/2}$ and $SiO_2$, the said mixture containing 1.35 mol of SiH functions per 100 g;

catalyst C: Karstedt-type platinum catalyst consisting of a solution containing 2000 ppm of platinum metal in a polydimethylsiloxane oil containing dimethylvinylsilyl ends; the said solution containing 0.041 mol of vinyl/ 100 g.

The device thus comprises 4 supply sources to constitute the composition, namely: premix AD, POS B, POS A and catalyst C.

1.2. Calibration of the Volumeters:

The volumeters 1 assigned to the supply sources AD, B and A, on the one hand, and the supply source of catalyst C, on the other hand, are adjusted such that the proportions used are as follows:

(AD+B+A): C→100 parts by weight: 6 parts by weight; i.e. 120 ppm of Pt relative to A+D.

In the same way, the volumeters 1 corresponding to AD, B and A are adjusted such that the proportions between these constituents are as follows:

AD: A→66 parts by weight: 33 parts by weight, (AD+A): B →100 parts by weight: 4.5 parts by weight.

With these proportions: the SiH: SiVinyl molar ratio is equal 1.8; the amount of inhibitor D is equal to 0.10% relative to the total mass of A.

It is also found that the BLT of the mixture is only 35 min.

1.3. Other Parameters

The following parameters are also established as indicated below:

Flow rate at mixer outlet: 51 g/min;

Capacity of the coating member buffer reserve: 200 g;

Rate of consumption of the crosslinking composition: 3 kg/hour;

Strip travelling speed: 150 meters/min;

Temperature gradient in the tunnel oven: 1st zone: 110° C., 2nd zone: 100° C. and 3rd zone: 100° C.

1.4. Functioning

The device is switched on and the cylinder coating head 5 is continuously supplied for 3 hours with the mixture of products AD, B, A and C. The paper coated using this coating member is a glassine-type paper. The deposition is carried out at a rate of 1 g/m². It is crosslinked in-line by passing through a tunnel oven, at a temperature of about 100° C., the travelling speed being 150 m/min.

This continuous functioning was carried out without any notable problems. In particular no gelation took place. The quality of the anti-adhesive coating obtained is entirely satisfactory.

The supply of compounds AD, B and A is ensured by the volumeters and/or by a pump, for example a pneumatic pump and/or by pressurizing the reservoirs which constitute the supply sources of the various constituents.

The control of the opening of the electrovalves 8 is programmed such that the premixing means 2 and mixing means 3 are supplied in repeating sequences AD/B/A, on the one hand, and ADB/C, on the other hand, respectively.

The programming of the control unit obviously integrates the variables or the parameters for controlling the volumeters and the electrovalves.

1.5. Evaluation of the Process

Figure 2:
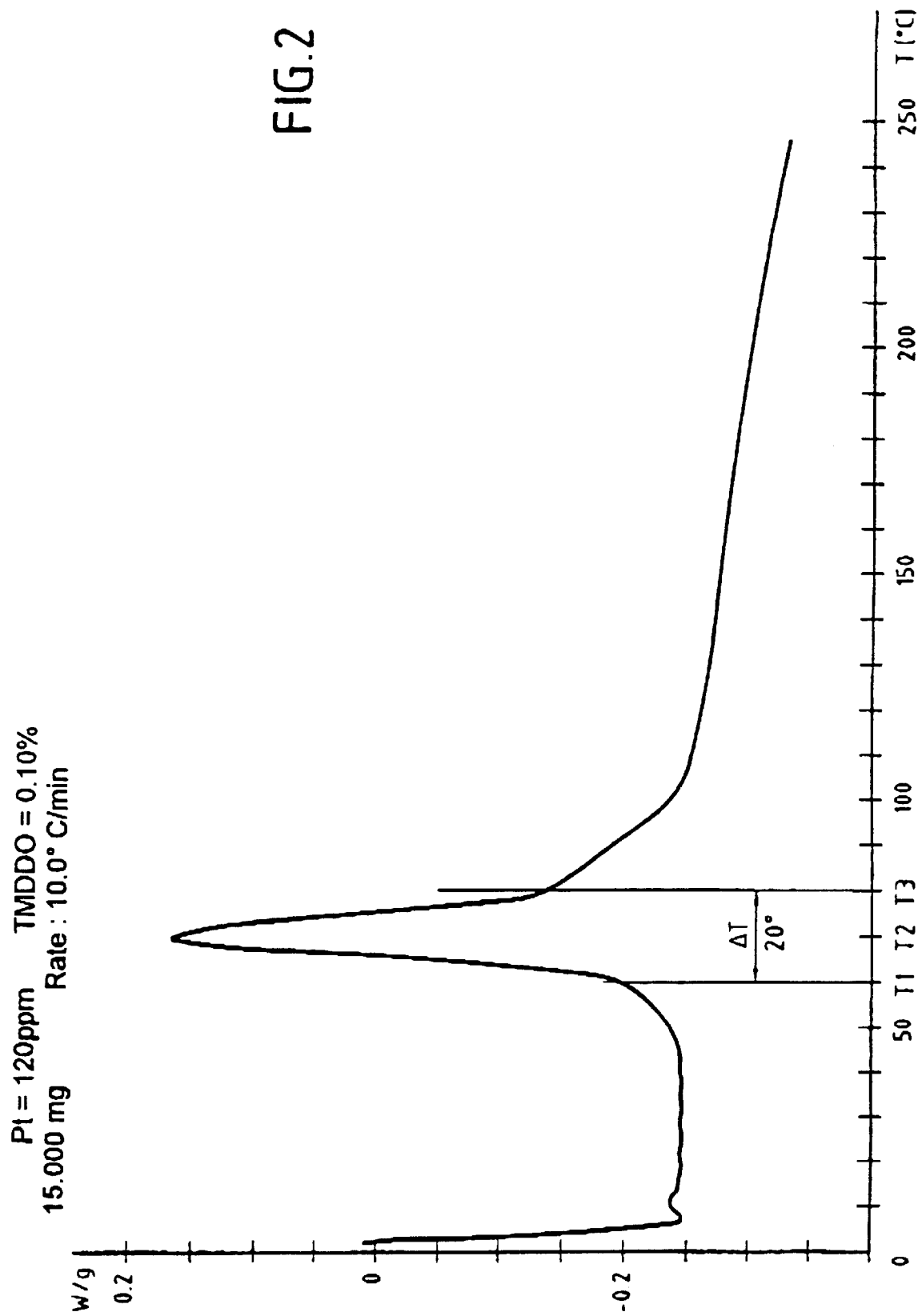
FIG. 2 is a diagram of a DSC signature of a homogenous mixture in the process of the present invention wherein DSC conditions are satisfied.

Characterization of the homogeneous mixture obtained from the ingredients A, B, D and C is carried out by differential thermal analysis DSC using a TA 4000 Metler machine: the curve given in FIG. 2 gives access to the following values (also given by the machine):

peak start temperature T1: 60.5° C., peak summit temperature T2: 70.3° C., peak end temperature T3: 80.4° C.,

ΔT=T3−T1: 19.9° C.

The following are also found:

ΔTref=18.7° C.

ΔT=ΔTref+1.2° C.

The visual quality of the mixture obtained from the ingredients A, B, D and C is also assessed after having taken care to initially dye the catalyst C. It is observed that the result obtained is satisfactory since the coloration of the mixture is homogeneous.

Example 2

Tests at Different Concentrations of Inhibitor D

The conditions are the same as in Example 1 above, except as regards the parameters given in Table 1 below.

TABLE 1

| | % TMDDO relative to A | |
|---|---|---|
| | 0.15% | 0.05% |
| T1 | 72.9° C. | 43.6° C. |
| T2 | (5) 80.6° C. | 56.9° C. |
| T3 | 88.4° C. | 72.3° C. |
| BLT | 4 hours | 15 min |

Pt = 120 pp

Comments

Very reactive silicone systems with very short BLTs can be used, leading to a final product which satisfies the required application constraints.

What is claimed is:

1. A process for the continuous coating of a traveling support strip to render it anti-adhesive, the coating comprising:

i) at least one polyorganosiloxane A;

ii) at least one crosslinking agent B that is crosslinkable with polyorganosiloxane A via hydrosilylation or dehydrogenopolycondensation;

iii) an effective amount of a catalyst C;

the process comprising:

a) continuously preparing in a premixing means a first premix selected from the group consisting of AB, AC, and BC;

b) continuously preparing in a mixing means a homogenous mixture of components A, B and C by mixing the premix with the component not present in the premix Or by mixing the premix with a second premix comprising the component not present in the first premix, the homogeneous mixture being prepared under the following conditions:

aa) a bath lifetime BLT of less than 10 hours;
bb) a differential scanning calorimetry DSC signature having at least one Gaussian peak showing:
  aaa) a peak start temperature $T_1$;
  bbb) a peak summit temperature $T_2$;
  ccc) a peak end temperature $T_3$;
    the Gaussian peak having the following:
      aaaa) $T_3 \leq 110°$ C.
      bbbb) $\Delta T = T_3 - T_1 \leq 30°$ C.; and
      cccc) $\Delta T = \Delta T_{ref} \pm 10°$ C.
        wherein $\Delta T_{ref} = \Delta T_{3,ref} - \Delta T_{1,ref}$ is obtained from the DSC signature peak of a reference ABC mixture having A, B and C, the homogenous mixture being prepared at a flow rate corresponding to the rate of consumption of the homogenous mixture at a coating member and the maintenance of a buffer reserve;

wherein metered amounts of components A, B, and C are introduced into the premixing means and the mixing means in a sequenced and iterative manner and wherein, for each component A, B, and C, volumetric metering means are used which are capable of ensuring the supply of metered amounts of each of these components, as well as, at least partially, their circulation in a continuous flow, along the entire length of the operating line;

c) conveying the homogenous mixture from the mixing means to the coating means;
d) coating the traveling support strip with the homogenous mixture from the coating means;
e) allowing the crosslinking to occur.

2. A process according to claim 1, wherein
(i) $T3 \leq 90°$ C.,
(ii) $\Delta T = T3 - T1 \leq°$ C., and
(iii) $\Delta T = \Delta T$ ref $\pm 8°$ C.,
and wherein the bath life is less than 4 h.

3. A process according to claim 1, wherein the dynamic viscosity at 25° C. of the homogeneous mixture is less than or equal to 10,000 mPa.s.

4. The process according to claim 3, wherein the dynamic viscosity is less than or equal to 1000 mPa.s.

5. A process according to claim 1, wherein the polyorganosiloxane A have, per molecule, at least two groups RGa, located in the chain or at the chain end(s), each having a $C_2$–$C_{10}$ alkenyl group linked to the silicon, wherein the crosslinking agent B is a polyorganosiloxane having, per molecule, at least two groups RGb, each consisting of a hydrogen atom linked to the silicon, located in the chain or at the chain ends(s); and wherein A reacts with B by hydrosilylation, with the proviso that the molar ratio RGb:RGa is between 1 to 5.

6. A process according to claim 5, wherein the groups RGa, are a vinyl group, the crosslinking agent B contains, per molecule, at least three groups RGb, with the proviso that the molar ratio RGb:RGa is between 1.5 to 2.5.

7. A process according to claim 1, where the polyorganosiloxane A has at least two condensable or hydrolysable groups RGa, located in the chain or at the chain ends, each group consisting of a group OR linked to the silicon, wherein R is a hydrogen atom or a $C_1$–$C_6$ alkyl radical, wherein the crosslinking agent B is a polyorganosiloxane having reactive groups RGb wherein RGb is hydrogen; and wherein A reacts with B by dehydrogenopolycondensation, and wherein the molar ratio RGb:RGa is between 1 and 5.

8. A process according to claim 5, wherein the crosslinking between A and B takes place at least partly according to a hydrosilylation mechanism, the coating further comprising at least one cross linking inhibitor D being selected from the group consisting of α-acetylenic alcohols, azodicarboxylates, and maleic esters, and wherein $\Delta T_{ref} = \Delta T_{3,ref} - \Delta T_{1,ref}$ is obtained from the DSC signature peak of a reference ABCD mixture having A, B, C and D.

9. A process according to claim 8, wherein the inhibitor D is 3,7,11-trimethyldodec-1-yn-3-ol (TMDDO), or ethynyl-cyclohexanol (ECH).

10. A process according to claim 1, wherein the mixture further comprises;
i) an aliphatic or aromatic organic solvent which does not take part in the reaction, or ii) water.

11. A process according to the process of claim 1, further comprising: heating the coated support strip.

12. A process according to claim 11, wherein the premixing means comprises at least one upstream premixing chamber and a downstream static premixing means, and wherein the mixing means comprises at least one upstream mixing chamber and downstream static mixing means.

13. A process according to claim 1, wherein the coating is carried out with a size press, an air knife, a Meyer bar, a direct etch head, or a multicylinder head.

14. A process according to claim 11, wherein the means for coating the traveling support strip is selected from the group consisting of a size press, an air knife, a Meyer bar, a direct etch head, and a multicylinder head.

* * * * *